UNITED STATES PATENT OFFICE.

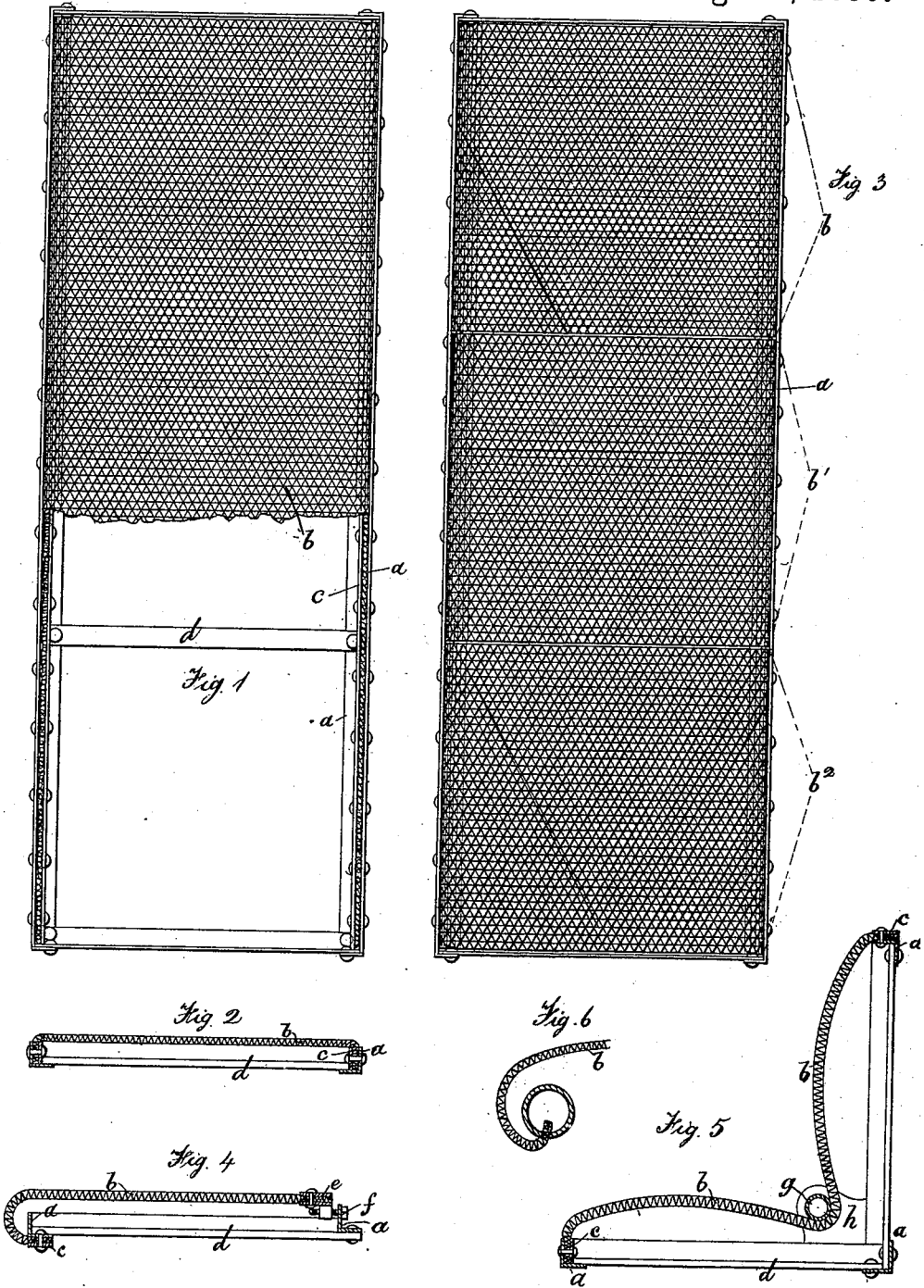

GEORGE WOODS AND EDWIN WOODS, OF WARRINGTON, COUNTY OF LANCASTER, ENGLAND.

SEAT AND SEAT-BACK.

SPECIFICATION forming part of Letters Patent No. 434,495, dated August 19, 1890.

Application filed August 16, 1889. Serial No. 321,020. (No model.) Patented in England July 20, 1887, No. 10,134; in France September 1, 1887, No. 185,612; in Belgium September 7, 1887, No. 78,798; in Italy September 7, 1887, No. 22,260; in Spain December 20, 1887, No. 11,812; in Austria-Hungary December 30, 1887, and in British India January 20, 1889, No. 9.

*To all whom it may concern:*

Be it known that we, GEORGE WOODS and EDWIN WOODS, both of Warrington, in the county of Lancaster, England, have invented a new and useful Improvement in Seats and Seat-Backs, (which has been patented to us in the following countries: Great Britain, Patent No. 10,134, dated July 20, 1887; France, Patent No. 185,612, dated September 1, 1887; Belgium, Patent No. 78,798, dated September 7, 1887; Austria-Hungary, dated December 30, 1887; Italy, Patent No. 22,260, dated September 7, 1887; Spain, Patent No. 11,812, dated December 20, 1887, and British India, Patent No. 9, dated January 20, 1889;) and we do hereby declare the following to be a full, clear, and exact description thereof.

The invention relates to seats and seat-backs in the form of a bench or couch of greater length than width, and adapted to seat two or more persons, for use in railway and tramway carriages, ships, halls, and like places.

The object is to enable resilient woven-wire webbing to be satisfactorily used for the above purpose in a simple and efficient manner. Hitherto when resilient woven-wire webbing has been used in the construction of seats and seat-backs of greater length than width, and adapted to seat two or more persons, such webbing has been stretched lengthwise of the seat, and springs or dividing-pieces have been placed at intervals along the seat or back to carry the said webbing and prevent sagging and displacement by variation in the number of occupants; but such construction has not prevented the motions of one occupant from objectionably affecting that portion of the webbing sat on or leaned against by another occupant. Now under our invention we construct such double seats and backs, which are of greater length than width, in such manner that the above objections are obviated, and we effect this by stretching the resilient wire webbing transversely instead of longitudinally, and in constructing the seat and back frames with transverse stays to resist the pull of the webbing on the side bars of the frame. The webbing is all in one piece, or is divided into sections transversely.

In order that our invention may be readily understood, we have appended a sheet of drawings, in which—

Figure 1 is a plan, and Fig. 2 is a transverse section, of a seat or back with the wire web all in one piece. Fig. 3 is a plan of a seat in which the wire web is in transverse sections. Fig. 4 is a transverse section of a seat or back having means for tightening the wire web, and Fig. 5 is a transverse section of a combined seat and back. Fig. 6 is a sectional detail view showing means for attachment of the woven-wire web.

In all the views the same letters denote like parts.

Referring to Figs. 1 and 2, $a$ is a frame of angle-iron bars riveted together. $b$ is wire web stretched transversely across the frame $a$ and passing between the sides of the said frame and the bars $c$. The bars $c$ are secured in position by being riveted to the frame $a$. $d$ are stays or trusses extending from the front to the back of the frame $a$, so as to prevent the sides from being drawn together by the strain of the wire web.

Referring to Fig. 3, $b$ $b'$ $b^2$ show three pieces of wire web stretched transversely, each piece of web serving as a seat for one person.

Referring to Fig. 4, only one edge of the web is secured to the frame, while the other edge is attached to a bar $e$, which is capable of being drawn nearer to the frame $a$ by set-bolts $f$ when it is desired to stretch the web still tighter.

Referring to Fig. 5, the frame $a$ is L-shaped in cross-section, and the web is stretched from the back to the front of the seat, passing at the junction of the back and seat under a bar $g$, secured by brackets $h$ to the frame $a$. Instead of angle or T iron, pipes having a slit through which the web is inserted can be used, as shown in Fig. 6.

The web we have found most suitable consists of interwoven spirals of wire tempered so as to recover their normal position under any ordinary strain.

We claim—

1. In a seat, the combination of a seat-frame of greater length than width, so as to be adapted to seat more than one person, and resilient wire webbing stretched transversely between and secured to the front and rear edges of the frame, substantially as and for the purposes described.

2. In a seat, the combination of a seat-frame $a$, of greater length than width, so as to be adapted to seat more than one person, transverse braces $d$, secured to the frame, and resilient wire webbing stretched transversely between and secured to the front and rear edges of the frame, substantially as and for the purposes described.

3. In a combined seat and back, the combination of an L-shaped frame of greater length than width, so as to be adapted to seat more than one person, a longitudinal bar $g$ at the elbow of the frame, and resilient wire webbing stretched transversely between and secured to the top and front edges of the L-shaped frame and passing under the bar $g$, substantially as and for the purposes described.

In testimony whereof we have hereunto set our hands this 25th day of July, 1889.

GEORGE WOODS.
EDWIN WOODS.

Witnesses:
JOHN E. HARRISON,
AUSTIN VERNON.